July 31, 1934.  C. R. MASTIN  1,968,650
PACKING
Filed Feb. 11, 1933
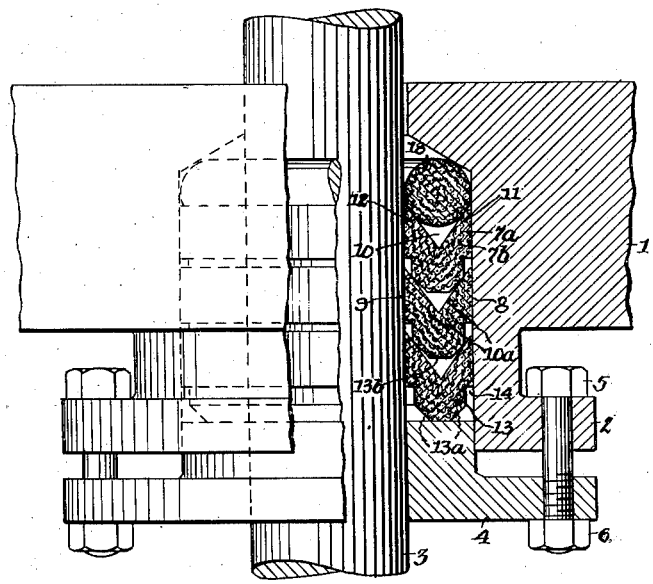
Fig. 1.
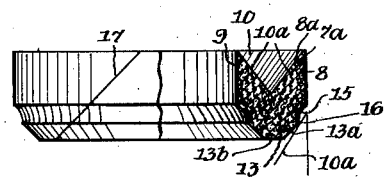
Fig. 2.
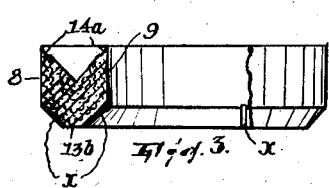
Fig. 3.
Fig. 3a
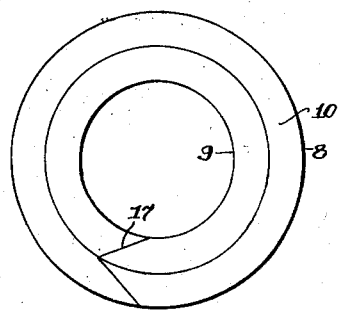
Fig. 4.
INVENTOR,
Charles R. Mastin
BY
ATTORNEY Patented July 31, 1934

1,968,650

UNITED STATES PATENT OFFICE 1,968,650

PACKING

Charles R. Mastin, Midland Park, N. J.

Application February 11, 1933, Serial No. 656,301

4 Claims. (Cl. 288—1)

This invention relates to cylindrical packing of yielding material such as is used in stuffing boxes and the like, and particularly to that class of such packings in which there is a plurality of coaxial packing elements of substantially equal diameter each having a peripheral substantially cylindrical sealing surface and, as to each two juxtaposed elements, one having coaxial with itself a tapering annular portion which has one face thereof formed by the sealing surface of such element and which terminates in a relatively sharp lip and the other element having coaxial with itself an annular portion concentric with and bearing on the conical face of the first-named portion (the usual construction contemplating the presence of two such tapering portions on the first element, with a channel between them, and that said portion of the other element is received in such channel, or is between such tapering portions), whereby on pressure of the packing lengthwise of its axis, as by the bolts and nuts for the gland of the box, the tapering portion will be displaced laterally into sealing contact with the piston or equivalent rod or the wall of the box flanking such portion, it being further the theory that the pressure of the fluid seeking to escape between the packing and such rod or wall will act, by the fluid entering between the said portions of the two elements, to displace the tapering portion laterally against such rod or wall.

But as such packings are usually constructed the fluid cannot enter between said portions so that it fails to be an actual factor in the sealing, wherefore such extraneous pressure (as by the gland of the box) has to be effected that undue resistance to the movement of the rod is imposed and the packing is crushed and its durability consequently impaired.

My invention contemplates an improvement in this class of packing whereby the fluid may in fact act in accordance with the mentioned theory and the extraneous pressure necessary to be applied to the packing, as by the bolts and nuts, need not be so great as to set up undue friction and hence resistance to the movement of the rod and cause injury to the packing, wherefore the packing according to my improvement will be much longer-lived than the ordinary packing of this class.

In the drawing,

Fig. 1 shows partly in section and partly in side elevation the stuffing-box portion of a cylinder and packing constructed in accordance with this invention;

Figs. 2 and 3 are views partly in section and partly in side elevation illustrating modifications of one element of the packing;

Fig. 3a is a view of the profiles of the adjoining portions of two of the elements when formed as in Fig. 3; and Fig. 4 shows one of the elements in Fig. 1 in plan.

1 designates the end of a cylinder having a projecting flange 2; 3 is the rod, as of a piston, and 4 the gland, these parts as usual forming the stuffing box; and 5 designates the bolts and 6 the nuts thereon for drawing the gland inwardly to compress the packing in the box.

According to the well-known practice each element of the packing is an annular body, composed of laminated duck 7a and rubber 7b, which is placed in a suitable mold and under pressure and with a vulcanizing agent and heat present shaped to the form required. According to this invention such form is as follows:

8 and 9 designate the outer and inner peripheral sealing faces of said body which are here cylindrical. In one side of the body is a channel 10 concentric with said body and having its surfaces 10a conical and converging and preferably forming sharp angles with the faces 8 and 9; in other words, each side of the channel there is, coaxial with said body, a tapering annular portion which has one face thereof formed by the corresponding sealing surface and the opposite face thereof substantially conical and forming with the first face a relatively sharp terminal lip, as 11 or 12, such portion at its opposite or conical face being adapted to divert fluid under pressure seeking to escape between the rod, or the box-wall, and packing and thereupon act to displace such tapering portion laterally into hermetic sealing contact with said rod or box-wall.

The opposite side of each such body or element has an annular portion 13 coaxial therewith here formed in section as a wedge, or with converging faces 13a, and preferably it has a face 13b which conforms to a plane perpendicular to the axis of the packing. The angularity of the faces 13a with respect to the axis of the packing is more obtuse than that of the corresponding faces 10a.

Rabbets are formed in each element so as to adjoin the next element, being open circumferentially of the packing and serving to allow fluid under pressure to enter between the elements. In Figs. 1 and 2 they are one inward and the other outward of the portion 13, being in Fig. 1 angular in section, as at 14, and in Fig. 2 curved in section, as at 15. In Fig. 3a they are at the channel sides of the tapering portions of the element as at 14a.

Further, in the case of the examples of Figs. 1 and 2 or that of Fig. 3a the portion 13 of one element and either tapering portion of the neighboring element have only a line-contact with each other, such being near the corresponding lip and afforded by the annular edge at 16 in Fig. 2 and between the rabbet and the conical face of the tapering portion in Fig. 3a. In any case the rabbet, as shown, is relatively outward of the corresponding line-contact; the term "outward" being here used to mean toward the adjoining periphery (inner or outer, as the case may be).

Having regard to the fundamental of my invention, the packing may be treated as including two juxtaposed packing elements of yielding material one of which has a peripheral substantially cylindrical sealing surface (as 8 or 9) and a conical surface (as 10a) presented to the other element which is arranged in acute-angular relation to and reaches close to said sealing surface, said other element having an annular edge (as 16) seating on the conical surface in only a narrow zone thereof relatively close to the sealing surface, or near the edge of the resulting lip. In the preferred form the packing has a circumferential groove (here incident of the rabbet 14, 14a or 15) forming with the sealing surface of the first element a relatively sharp edge on the latter.

To insure the fluid entering the channel of each element and thereby becoming active on the entire inner surface of each lip there may be one or more radial passages formed in one of two adjoining elements, as at x in Fig. 3.

Having assembled the elements in the box as shown in Fig. 1 with, as usual, an annular end member 18 (here, round in cross-section and also consisting of layers of rubber and duck, treated to give it its shape the same as the packing elements) engaged in the channel of that element which is at the inner end of the box the gland is applied and the bolts and nuts made to cause the gland to exert pressure on the packing thus formed.

Thus the packing may be said to comprise two elements of yielding material and equal diameter each having a peripheral substantially cylindrical sealing surface (as 8 or 9) and one element having coaxial with itself a tapering annular portion which has one face formed by its said sealing surface and terminates in a relatively sharp lip (as 11 or 12) and the other element having coaxial with itself an annular portion (as 13) extending into concentric relation with and having contact with said tapering portion in a zone thereof (here afforded by a mere edge, as for example at 16, inward of but relatively close to said lip, one such portion having, between such lip and zone, an annular rabbet (as 14, 15 or 16) adjoining the other portion and open peripherally of and thus forming a circumferential groove in the packing, whereby fluid pressure tending to escape toward the gland will enter the rabbet and act to press the extremity or lip-including part of said tapering portion into sealing relation to the box-wall or rod; if the mentioned contact is afforded by a mere edge the pressure admitted to the rabbet may find its way past such edge so as to become active on the whole conical surface of said tapered portion.

In any event, because the fluid pressure is thus allowed to act to form the seal less extraneous pressure on the packing, as by the gland, is necessary, wherefore the packing is saved from the destructive influence of such extraneous pressure and its life consequently prolonged.

Having thus fully described my invention, what I claim is:

1. Packing including two annular juxtaposed coaxial packing elements of yielding material and equal diameters each having a peripheral substantially cylindrical sealing surface and one element having coaxial with itself a tapering annular portion which has one face thereof formed by the sealing surface of such element and the opposite face thereof substantially conical and forming with the first face a relatively sharp terminal lip and the other element having coaxial with itself an annular portion extending into concentric relation to and having contact with said conical face in a zone thereof inward but relatively close to said lip, one such portion having, between such lip and zone, an annular rabbet adjoining the other portion and open peripherally of the packing.

2. Packing including two annular juxtaposed coaxial packing elements of yielding material and equal diameters each having a peripheral substantially cylindrical sealing surface and one element having coaxial with itself a tapering annular portion which has one face thereof formed by the sealing surface of such element and terminates in a relatively sharp lip and the other element having coaxial with itself an annular portion extending into concentric relation to the first-named portion, one of said portions having coaxial with itself an annular edge in contact with the other such portion relatively near the lip and one such portion having, relatively outward of said edge, an annular rabbet adjoining the other portion and open peripherally of the packing.

3. Packing including two annular juxtaposed coaxial packing elements of yielding material and equal diameters each having a peripheral substantially cylindrical sealing surface and one element having coaxial with itself a tapering annular portion which has one face thereof formed by the sealing surface of such element and terminates in a relatively sharp lip and the other element having coaxial with itself an annular portion extending into concentric relation to the first-named portion, one of said portions having coaxial with itself an annular edge in contact with the other such portion relatively near the lip and said packing having a circumferential groove adjoining the lip.

4. Packing including two annular juxtaposed coaxial packing elements of yielding material and equal diameters each having a peripheral substantially cylindrical sealing surface and one element having coaxial with itself a tapering annular portion which has one face thereof formed by the sealing surface of such element and terminates in a relatively sharp lip and the other element having coaxial with itself an annular portion extending into concentric relation to the first-named portion, one of said portions having coaxial with itself an annular edge in contact with the other such portion relatively near the lip and a channel crossing said edge, and said packing having a circumferential groove adjoining the lip.

CHARLES R. MASTIN.